Figure 1:
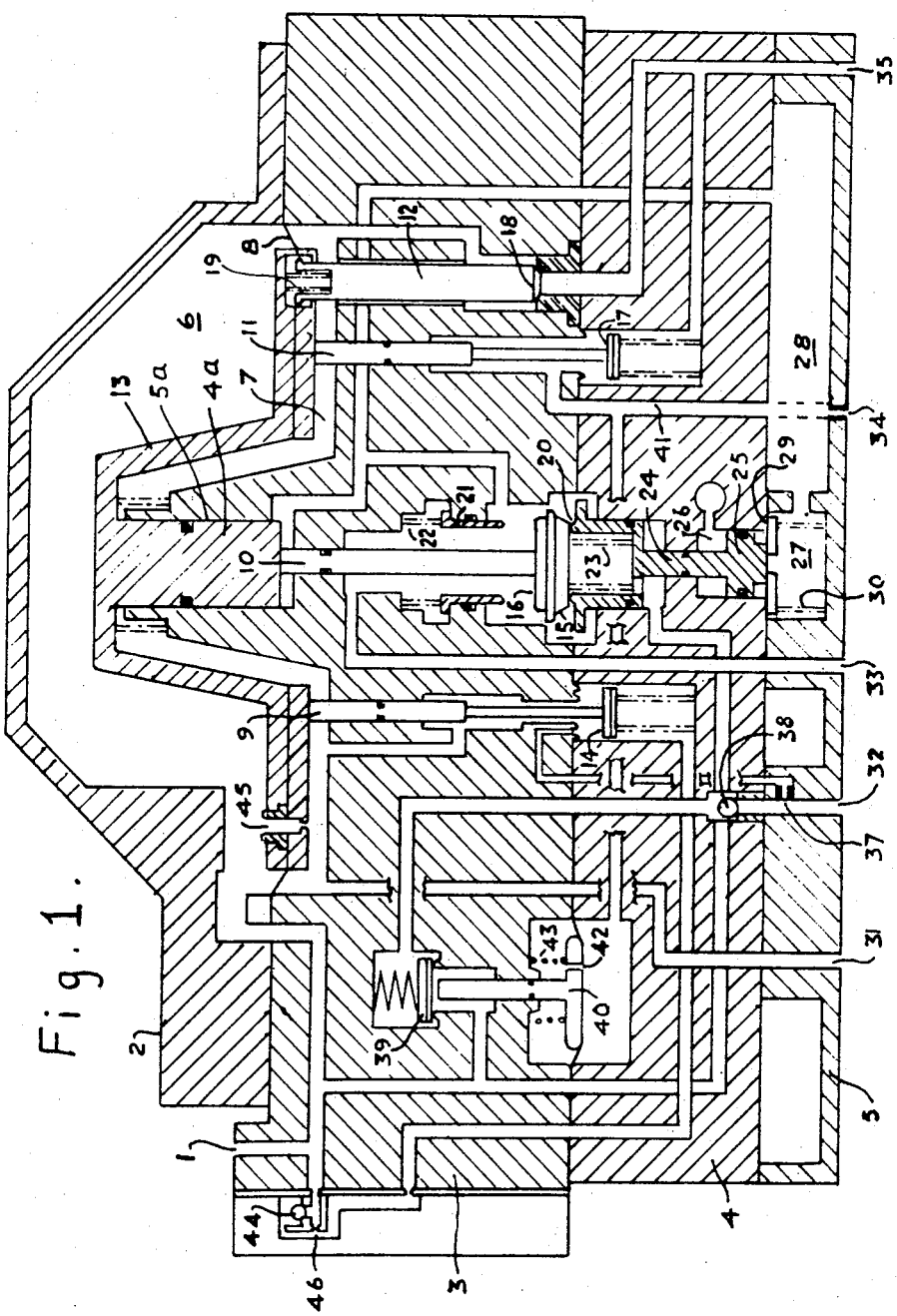

United States Patent
Paginton

[15] 3,707,314
[45] Dec. 26, 1972

[54] BRAKE CONTROL VALVE APPARATUS

[72] Inventor: Philip Norman Paginton, London, England

[73] Assignee: Westinghouse Brake and Signal Company Limited, London, England

[22] Filed: Feb. 16, 1971

[21] Appl. No.: 115,650

[30] Foreign Application Priority Data

March 19, 1970 Great Britain.....................13,301/70

[52] U.S. Cl.....................................303/36, 303/69
[51] Int. Cl. ..............................................B60t 15/52
[58] Field of Search...........................303/33, 36–38, 303/69, 70, 85

[56] References Cited

UNITED STATES PATENTS

| | | | |
|---|---|---|---|
| 2,939,746 | 6/1960 | Pickert | 303/70 |
| 3,175,869 | 3/1965 | Kirk | 303/36 X |
| 3,369,847 | 2/1968 | Lee | 303/70 |
| 3,472,562 | 10/1969 | Washbourn | 303/33 X |

*Primary Examiner*—Duane A. Reger
*Attorney*—Larson, Taylor and Hinds

[57] ABSTRACT

An improved form of triple valve for brake control applications has a quick service bulb and quick service exhaust and inlet valves so arranged that following initiation of a brake application, and movement of the main pile of the triple valve, the bulb inlet valve opens before the exhaust valve closes thereby dumping a small amount of brake pipe pressure but on the bulb pressure building up, a special pressure responsive conditioning device is operated to bring the quick service valve closure member and seat closer together to ensure that on movement towards lap position or release position of the main pile, the bulb inlet valve is sealed off before the bulb exhaust valve which has a slidable spring loaded seat, opens. This ensures that loss of recovering brake pipe pressure does not occur between the bulb inlet and exhaust valves on release of the brake.

14 Claims, 2 Drawing Figures

| # BRAKE CONTROL VALVE APPARATUS

This invention relates to brake control valve apparatus and relates particularly to aspects of such apparatus for enabling quick service operation in response to a change of brake pipe pressure in a sense to cause a brake application.

According to the present invention there is provided fluid operable brake control valve apparatus having brake cylinder inlet and exhaust valves for controlling the supply of fluid pressure into and out of the brake cylinder said valves being operable by a pressure responsive member movable in response to pressure applied to a brake pipe and a quick service bulb inlet valve via which the brake pipe is connectable to a quick service bulb capacity, a bulb exhaust valve via which the quick service bulb capacity is ventable, the bulb inlet valve and the bulb exhaust valve being operable by the member to effect a discharge of brake pipe pressure into the bulb capacity during movement of the member in a first direction in which opening of said brake cylinder inlet valve takes place, conditioning means being included for causing closure of the bulb inlet valve to be effected during movement of the member in a second direction in which opening of the brake cylinder exhaust valve takes place this closure of the bulb inlet valve being at a position of the member in advance of the position at which the said opening of the bulb inlet valve is effected during movement of the member in the first direction, and to effect closure and opening respectively of the bulb inlet and bulb exhaust valves in that order during movement of the member in the second direction.

The bulb inlet valve and bulb exhaust valve may have closure members and valve seats and the conditioning means may be operable to provide relative displacement between the bulb inlet valve seat and closure member independently of displacement of the pressure responsive member.

The bulb inlet valve seat may be movable within the apparatus towards the bulb inlet closure member.

The bulb inlet valve seat may be so movable in response to fluid pressure in the bulb capacity.

The bulb exhaust valve seat and the bulb exhaust valve closure member may be displaceable together within the apparatus with the bulb exhaust valve in the closed condition thereof. Here, the bulb exhaust valve seat may be spring loaded in a direction towards a bulb exhaust valve closure member.

In the foregoing, it is to be understood that pressure applied to the brake pipe may be in the form of a reduced pressure or in the form of an increased pressure, although it will be appreciated that in most accepted forms of railway braking equipment, a brake application is achieved by applying reduced pressure to the brake pipe.

Figure 2:
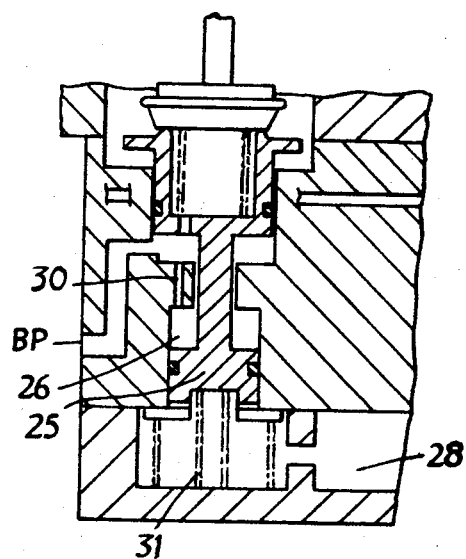

In order that the present invention may be more clearly understood and readily carried into effect, the same will be further described by way of an example with reference to the accompanying drawings of which, FIG. 1 illustrates in schematic form a brake control valve apparatus which makes use of one embodiment of the invention, and FIG. 2 illustrates the relevant parts of a modification of the apparatus of FIG. 1.

The apparatus shown in the drawing consists essentially of a triple valve connected to a brake pipe at a port denoted by the reference 1 and the apparatus comprises four main body sections 2, 3, 4 and 5 which are bolted with unshown bolts together with suitable intermediate seals, not shown, to complete the unit. Within the upper portion 2, there is provided a pressure responsive member 13 having a main stem 4a which is slidable within a guide in the section 3. Separation between the air volumes 6 and 7 on either side of the pressure responsive member is achieved by the provision of a diaphragm 8 clamped firstly into the pressure responsive member and secondly between the sections 2 and 3 referred to above, sufficient flexibility in the diaphragm being provided to permit unimpeded movement of the pressure responsive member.

The pressure responsive member 13 operably engages four valve stems denoted by references 9, 10, 11 and 12 respectively, the first three being sealingly slidable in the housing. Stem 9 carries an auxiliary reservoir charging valve and accelerated release reservoir valve closure member 14 operable to close off two concentric charging valve seats. Stem 10 carries a bulb inlet valve closure member 15 and a bulb exhaust valve closure member 16, stem 11 carries a brake cylinder exhaust valve closure member 17 and stem 12 itself constitutes a brake cylinder inlet valve closure member at its seating end portion 18. Additionally, it will be noted that the valve stem 12 is mounted to provide a certain amount of lost motion in the pressure responsive member 13 and is urged downwardly by a suitable internally provided housed spring 19 as shown. Each of the above mentioned valve closure members or portions has associated valve seats which do not require enumerating in themselves. Particular attention may be drawn to the bulb inlet valve seat 20 and the slidable bulb exhaust valve seat 21 each of which are sealingly slidable within the housing between upper and lower stops. The requirements for the relative spacings of the valve seats under various conditions will be appreciated when the operation of the apparatus is considered in more detail. The sliding seat 21 is urged downwardly by a light spring 22 and the seat 20 is provided with a light spring 23 which is engagable with the respective closure member 15 as 15 approaches the closed position. Further, the sliding seat 20 is connected via a sealingly slidable connecting rod 24 to a piston 25 which is slidable in a cylindrical chamber 26 an upper volume of which is vented to atmosphere and a lower volume of which communicates with a chamber 27 connected to the quick service bulb capacity 28 of the apparatus. In the stable released position of the apparatus as shown, the piston 25 rests against a lower stop 29 which is normally supported by a suitably strong spring 30 in the housing.

In addition to the brake pipe port 1, the apparatus is provided with a port 31 for connection to an auxiliary reservoir, a port 32 for connection to an accelerated releaser reservoir, exhaust ports 33 and 34 and a brake cylinder connection port 35. It will be seen moreover that the accelerated release reservoir port 32 is connectable through choke 37, via an annular inlet valve with closure member 14 in the unseated condition to the auxiliary reservoir. The accelerated release reservoir is thereby chargeable from the brake pipe. The accelerated release reservoir is further connected via a one way check valve 38 to the input side of an accelerated release valve having a spring loaded closure member 39, this closure member being operable by a pressure responsive member 40 which is subject on the lower side to the pressure of a brake exhaust passage 41 and the other side of the pressure responsive member 40 is connected only through a small choke 42 to the lower side. This member 40 is further urged downwardly by a suitable spring 43.

Referring now to the other principal connections in the apparatus, the brake pipe port 1 is connected to the upper chamber 6 of the apparatus, the input side of the bulb inlet valve, the output side of the accelerated release valve having movable member 39 and also via a check valve 44 to the input side of the auxiliary reservoir and accelerated release reservoir charging valve having closure member 14. The output side of the auxiliary reservoir charging valve is connected to the chamber 7 beneath the pressure responsive member and this chamber is further connected to the auxiliary reservoir port 31 and to the input side of the brake cylinder inlet valve having closure member 18. The output side of the brake cylinder inlet valve is connected of course to the brake cylinder port 35. This port is also connected to the brake cylinder exhaust valve having closure member 17 the exhaust side of which is connected to the exhaust port 34 which is provided with a certain restriction enabling utilization of a proportional of brake cylinder exhaust air in other directions to effect accelerated release.

The quick service bulb capacity 28 is connected on the one hand to the lower area of the main stem 4a of the pressure responsive member and on the other hand to the chamber within which the closure members 15 and 16 of the bulb inlet and exhaust valves operate. Communication is thereby provided between the bulb and the brake pipe on parting of the closure member 15 and the valve seat 20.

A small restricted passage is provided at 45 through the pressure responsive member 13 and a similar passage is provided at 46 between the brake pipe and auxiliary reservoir. These passages are present for providing requisite long term pressure stability in the apparatus.

Considering the operation of the apparatus in general terms, it may be understood initially that the operation is in many respects substantially the same as that which occurs in previously known forms of triple valve. Thus, an unoperated state or release state of the brakes, is maintained by a predetermined brake pipe pressure above atmosphere being established at 1. Under these conditions, the main pressure responsive member and its stem 4a are in a position such as that shown in the drawing, where the brake cylinder is exhausted and the auxiliary reservoir is charged from the brake pipe to a substantially identical pressure. A brake application is achieved by a drop of brake pipe pressure and this permits air to be transmitted from the auxiliary reservoir into the brake cylinder up to the point at which a pressure drop occurs in the auxiliary reservoir to permit the apparatus to lap-off and to interrupt flow of air to the brake cylinder. The degree of braking pressure applied to the brake cylinder is dependent upon the reduction of brake pipe pressure which is initiated.

As mentioned above, the drawing shows the valve in the stable release position and with the apparatus fully charged from the brake pipe the auxiliary and brake pipe pressures are equal. There is in this position a resultant downward pressure on the pressure responsive member 13 due to the fact that the underside of the main stem 4a is at atmospheric pressure, the bulb inlet valve member 16 being separated from its associated seat 21. The pile comprising 13, 4a, 10, 16, 15, 20, 24 and 25 is therefore supported by the lower housed spring 30, the quick service inlet valve closure member 15 resting against its seat 20 and the brake cylinder inlet valve 18 being closed. Also, the accelerated release valve 39 is closed, the actuating member 40 thereof being in its stable lower position as shown owing to the thrust of spring 43. The auxiliary reservoir charging valve 14 is open. The brake cylinder exhaust valve 17 is open and since as mentioned above, the quick service exhaust valve member 16 is off its seat, the chamber 27 is at atmospheric pressure and no pressure is thereby exerted on the piston 25.

When the brake pipe pressure is reduced to apply the brake and as soon as the pressure difference which subsequently acts upwards across the pressure responsive member 13 overcomes the resultant downward force mentioned above, the pressure responsive member 13 moves upwards followed under the influence of spring 23, by the valve closure members 15 and 16 unseating the bulb inlet valve. Brake pipe pressure therefore flows into the bulb capacity 28 accelerating the movement of the pressure responsive member and closing in sequence the charging valve 14, the brake cylinder exhaust valve 17 and the quick service exhaust valve.

Following closure of the quick service exhaust valve, bulb pressure flows to the under side of the piston 25, and since the upper area of this piston is subjected only to atmospheric pressure, there is a resultant upward force which carries the slidable valve seat 20 upwards against the upper stop. Continued movement moreover of the pressure responsive member in an upward direction lifts the sliding valve seat 21 upwards towards its upper stop. Continued upward movement of the pressure responsive member 13 causes the brake cylinder inlet valve 18 to open to make a brake application by connecting the auxiliary reservoir to the brake cylinder port 35 until the auxiliary reservoir pressure descends to approximately the pressure in the brake pipe where-upon the pressure responsive member 13 moves downwards to close off the brake cylinder inlet valve 18. Stability in the lap position is then provided by the quick service bulb pressure acting on the quick service valve member 15 and the valve seat 21.

In order to release the brakes, the brake pipe pressure is increased above the auxiliary reservoir pressure by about 1½ p.s.i. to overcome the resistance of the air load on the seat 21 and the valve members 15 and 16 can then commence to move downwards followed by the member 21. Valve closure member 16 cannot unseat until the member 21 comes against its lower stop. Owing to the upward movement of the inlet valve seat 20 referred to above in response to bulb pressure, the closure member 15 engages the seat 20 before disengagement between the seat 21 and its closure member 16 occurs. This prevents the connection of the brake pipe to a bulb capacity which is venting via the bulb exhaust valve during the release operation where the brake pipe pressure is increasing.

Once the closure member 16 separates from its seat when the member 21 reaches its lower stop, bulb pressure is vented, the upward force on the pile is reduced and the whole assembly descends rapidly being assisted by the venting of the area under the stem 4a and also by the fact that the bulb pressure which was previously applied to the piston 25, is now removed. During this downward movement, the brake cylinder exhaust valve 17 and the auxiliary reservoir charging valve 14 are opened and the assembly comes to rest on the lower stop 29 above housed spring 30. It will be appreciated that the downward movement in practice is so rapid that overshoot can occur to the extent that the housed spring 30 may be depressed and final extreme stop position being provided by the lower stop for the member 20. However, the assembly returns to the position shown and the pressures in the brake pipe and the auxiliary reservoir recover to substantially their starting values.

In the apparatus described above, following commencement of a brake application, bulb pressure in 28 applies an upward thrust to the piston 25 to move upward the stem 24. In an alternative arrangement, a communication may be provided between chamber 26 not with atmosphere but with the brake pipe 1 and a thrust spring may be included beneath the piston 25 which is normally compressed by the brake pipe pressure on 25. Such an alternative is shown in FIG. 2 which shows only the relevant parts of the apparatus and from which it is seen that a passage 30 is now provided between brake pipe and the chamber 26 and the additional spring 31 is provided beneath the piston 25. The spring 31 is normally compressed by brake pipe (BP) pressure in the position shown in the release position of the brakes. When a reduction of brake pipe pressure gives rise to separation of the closure member 15 from its seat 20, an increase of pressure in 28 up to brake pipe pressure permits the spring 31 to rapidly raise the piston 25. This arrangement can have an advantage in that the spring 31 affords a more constant stability of the valve apparatus in the lap position if variations of the normal brake pipe and auxiliary reservoir pressures can vary from one train to another.

Referring now to the accelerated release feature of the apparatus, the accelerated release reservoir connected at 32 but not shown is charged from the brake pipe via choke 37 when the charging valve closure member 14 is open, that is in the brake release position of the apparatus. When during release after a brake application, the brake cylinder exhaust valve 17 opens, the passage between the brake cylinder exhaust valve 17 and the lower side of the pressure responsive member 40 is temporarily pressurized by brake cylinder exhaust air and the pressure responsive member 40 moves upwards thereby temporarily unseating the valve closure member 39 to permit the passage of air from the accelerated release reservoir through the port 32 via check valve 38 to the brake pipe which at the time considered is at a lower pressure. This supplements the rise of brake pipe pressure which has been started by the brake control valve and assists in rapid transmission of brake release from one such apparatus to the next such apparatus connected to the same brake pipe in a train. The pressures on either side of the pressure responsive member 40 equalize fairly rapidly by virtue of the choke 42 and the valve closure member 39 is thereby quickly reclosed so that the flow of air from 32 to the brake pipe for accelerated release is only of short duration.

In the manner of operation of accelerated release in the present embodiment, it will be appreciated that the accelerated release is piloted from the movement of the pressure responsive member 13 and conditional upon the actual commencement of brake release owing to the fact that it is brake cylinder exhaust air which is utilized to cause the temporary unseating of the valve 39.

Having thus described our invention what we claim is:

1. Fluid operable brake control valve apparatus having brake cylinder inlet and exhaust valves for controlling the supply of fluid pressure into and out of the brake cylinder, said valves being operable by a pressure responsive member movable in response to pressure applied to a brake pipe and a quick service bulb inlet valve via which the brake pipe is connectable to a quick service bulb capacity, a bulb exhaust valve via which the quick service bulb capacity is ventable, the bulb inlet valve and the bulb exhaust valve being operable by the member to effect a discharge of brake pipe pressure into the bulb capacity during movement of the member in a first direction in which opening of said brake cylinder inlet valve takes place, conditioning means being included for causing closure of the bulb inlet valve to be effected during movement of the member in a second direction in which opening of the brake cylinder exhaust takes place, this closure of the bulb inlet valve being at a position of the member in advance of the position in which the said opening of the bulb inlet valve is effected during movement of the member in the first direction, and to effect closure and opening respectively of the bulb inlet and bulb exhaust valves in that order during movement of the member in the second direction.

2. Fluid operable brake control valve apparatus as claimed in claim 1, the bulb inlet valve having a valve closure member and a valve seat which when apart are relatively displaceable by the conditioning means.

3. Fluid operable brake control valve apparatus as claimed in claim 2, the conditioning means comprising a pressure responsive device responsive to the quick service bulb pressure to relatively displace the valve seat and the closure member towards one another a predetermined distance.

4. Fluid operable brake control valve apparatus as claimed in claim 3, the bulb inlet valve seat being sealingly slidable in the housing of the apparatus and the pressure responsive device being a piston portion of the apparatus.

5. Fluid operable brake control valve apparatus as claimed in claim 4, the piston portion of the apparatus being subject on one side to brake pipe pressure and on the other side to quick service bulb pressure, the brake pipe pressure exerted on the piston being at least partially counter-balanced by the thrust of a spring.

6. Fluid operable brake control valve apparatus as claimed in claim 4, the piston being arranged to be subject on one side to atmospheric pressure and on the other side to quick service bulb pressure.

7. Fluid operable brake control valve apparatus as claimed in claim 5, the quick service bulb exhaust valve having a closure member and a valve seat which are movable one with the other over a predetermined part of the path of movement of the closure member.

8. Fluid operable brake control valve apparatus as claimed in claim 7, the bulb exhaust valve seat being spring loaded towards the bulb exhaust valve closure member.

9. Fluid operable brake control valve apparatus as claimed in claim 8, the bulb inlet valve and the bulb exhaust valve being arranged in line and being operable by a common push-rod on movement of the pressure responsive member.

10. Fluid operable brake control valve apparatus as claimed in claim 1, the apparatus including an accelerated release valve operable in response to release of fluid pressure from the brake cylinder via the brake cylinder exhaust valve to connect a charged reservoir to the brake pipe to assist a change of pressure in the brake pipe, which change is giving rise to the release.

11. Fluid operable brake control valve apparatus as claimed in claim 10, the accelerated release valve means being operable by a further pressure responsive member, one side of which is subject to pressure in a brake cylinder exhaust passage and the other side of which communicates with the one side through a choke, the member being normally biassed towards a position in which the accelerated release valve is closed.

12. Fluid operable brake control valve apparatus as claimed in claim 2, the quick service bulb exhaust valve having a closure member and a valve seat which are movable one with the other over a predetermined part of the path of movement of the closure member.

13. Fluid operable brake control valve apparatus as claimed in claim 12, the apparatus including an accelerated release valve operable in response to release of fluid pressure from the brake cylinder via the brake cylinder exhaust valve to connect a charged reservoir to the brake pipe to assist a change of pressure in the brake pipe, which change is giving rise to the release.

14. Fluid operable brake control valve apparatus as claimed in claim 13, the accelerated release valve means being operable by a further pressure responsive member, one side of which is subject to pressure in a brake cylinder exhaust passage and the other side of which communicates with the one side through a choke, the member being normally biassed towards a position in which the accelerated release valve is closed.

* * * * *